United States Patent [19]
Jang

[11] Patent Number: 5,984,832
[45] Date of Patent: *Nov. 16, 1999

[54] HYDRAULIC CONTROL SYSTEM FOR AN AUTOMATIC TRANSMISSION USED IN VEHICLES

[75] Inventor: Jae-Duk Jang, Kyungki-do, Rep. of Korea

[73] Assignee: Hyundai Motor Company, Seoul, Rep. of Korea

[*] Notice: This patent is subject to a terminal disclaimer.

[21] Appl. No.: 09/023,159

[22] Filed: Feb. 13, 1998

[51] Int. Cl.⁶ .................................................. F16H 61/26
[52] U.S. Cl. ............................................................ 477/130
[58] Field of Search ...................................... 477/131, 130

[56] References Cited

U.S. PATENT DOCUMENTS

| | | | |
|---|---|---|---|
| 5,536,216 | 7/1996 | Jang | 475/123 |
| 5,540,634 | 7/1996 | Jang et al. | 477/131 |
| 5,590,751 | 1/1997 | Jang et al. | 477/169 X |
| 5,611,749 | 3/1997 | Jang et al. | 477/65 |
| 5,643,123 | 7/1997 | Jang et al. | 477/906 X |
| 5,658,218 | 8/1997 | Jang et al. | 477/117 |

FOREIGN PATENT DOCUMENTS 74345  3/1989  Japan ...................... 477/117

*Primary Examiner*—Charles A Marmor
*Assistant Examiner*—Ha Ho

[57] ABSTRACT

A hydraulic control system for an automatic transmission including a plurality of friction elements associated with respective transmission speeds. The hydraulic control system includes a hydraulic fluid source, a line pressure controller, a reducing pressure controller, a range controller, a shift controller, a hydraulic pressure controller, wherein the hydraulic pressure distributor includes a 3-4 shift valve, a 2-3/4-3 shift valve, a 1-2 shift valve, a control switch valve for selectively supplying/exhausting hydraulic pressure from the shift controller to at least one of the friction elements corresponding to the respective transmission speeds to control operating timing of each corresponding friction element and supplying the hydraulic pressure from the shift controller to the line pressure controller to reduce line pressure at a high speed state; and a solenoid valve for controlling the control switch valve in accordance with a control signal of the transmission control unit.

6 Claims, 12 Drawing Sheets

FIG.9

HYDRAULIC CONTROL SYSTEM FOR AN AUTOMATIC TRANSMISSION USED IN VEHICLES

FIELD OF THE INVENTION

The present invention relates to a hydraulic control system for an automatic transmission used in vehicles.

BACKGROUND OF THE INVENTION

Generally, a conventional automatic transmission used in a vehicle includes a torque converter, a multi-stage gear shift mechanism connected to the torque converter, and a plurality of friction elements actuated by hydraulic pressure for selecting a gear shift stage of the gear shift mechanism.

The conventional automatic transmission is provided with a hydraulic control system which controls the automatic transmission.

In such a hydraulic control system, hydraulic pressure generated by a hydraulic pump is selectively supplied to each friction element by a plurality of control valves such that automatic shifting is realized in accordance with a driving state of the vehicle and engine throttle opening.

The above hydraulic control system generally comprises a line pressure controller for regulating hydraulic pressure generated by the hydraulic pump to line pressure, a damper clutch controller for actuating a damper clutch of the torque converter, a reducing pressure controller for reducing line pressure, a range controller for selectively supplying line pressure to lines corresponding to respective shift ranges, a shift controller for supplying hydraulic pressure from the range controller to lines corresponding to respective shift ranges, a hydraulic pressure controller for duty-controlling hydraulic pressure from the range controller into operational pressure operating the friction elements, and a hydraulic pressure distributor for determining a hydraulic flow path corresponding to each shift range by operating valves according to the hydraulic pressure from the shift controller, and suitably distributing the operational pressure to each friction element.

The shift controller operates spool valves of the hydraulic pressure distributor according to control from a transmission control unit such that the hydraulic flow path corresponding to each shift range is determined to realize shifting.

When changing shift stages, the timing of exhausting hydraulic pressure from one set of friction elements and supplying hydraulic pressure to another set of friction elements through the hydraulic flow path, determined by the shift controller in accordance with each shift range, greatly influence shift quality. However, a flaw in this timing can cause an abrupt increase in engine revolutions or locking of the shift mechanism. Further, abrupt changes in hydraulic pressure levels in the hydraulic flow path decreases the life span of the automatic transmission.

In order to improve shift quality and durability of the transmission by both accurately controlling the timing of pressure supply and minimizing changes in hydraulic pressure levels, a method of modifying shift valve structure has been developed. However, such a method complicates both the structure of the shift valves and the control process.

SUMMARY OF THE INVENTION

The present invention has been made in an effort to solve the above problems. It is an object of the present invention to provide a hydraulic control system used in an automatic transmission for a vehicle, which prevents a phenomenon in which shifting temporarily into a neutral N state occurs during shifting between different shift stages, and minimizes fluctuations in hydraulic pressure levels flowing in a flow path. Further, it is another object of the present invention to provide a hydraulic control system, which decreases line pressure at high speed stages such that power loss of a hydraulic pump is reduced.

To achieve the above object, the present invention provides a hydraulic control system for an automatic transmission including a plurality of friction elements associated with respective transmission speeds, the hydraulic control system comprising:

a hydraulic fluid source;

line pressure control means for regulating hydraulic pressure from the fluid source to line pressure;

reducing pressure control means for reducing hydraulic pressure from the line pressure control means;

range control means for selectively supplying hydraulic pressure from the line pressure control means;

shift control means for supplying hydraulic pressure from the range control means to lines corresponding to respective shift ranges by control of a transmission control unit;

hydraulic pressure control means for duty-controlling hydraulic pressure, supplied from the range control means, to convert the duty-controlled hydraulic pressure into control pressure for operating the friction elements; and hydraulic pressure distributing means for determining a hydraulic flow path corresponding to each shift range by operating valves according to the hydraulic pressure from the shift control means, and suitably distributing the hydraulic pressure from the shift control means or the control pressure to each of the friction elements;

wherein the hydraulic pressure distributing means comprises:

a 3-4 shift valve for realizing port conversion during 3-4 shifting to selectively supply/exhaust the control pressure to/from at least one of the friction elements corresponding to the respective transmission speeds;

a 2-3/4-3 shift valve for realizing port conversion during 2-3 or 4-3 shifting to selectively supply/exhaust the control pressure to/from at least one of the friction elements corresponding to the respective transmission speeds;

a 1-2 shift valve for realizing port conversion during 1-2 shifting to selectively supply/exhaust the control pressure and hydraulic pressure from the range control means to/from the 2-3/4-3 shift valve and at least one of the friction elements corresponding to the respective transmission speeds;

a control switch valve for selectively supplying/exhausting hydraulic pressure from the shift control means to at least one of the friction elements corresponding to the respective transmission speeds to control operating timing of each corresponding friction element and supplying the hydraulic pressure from the shift control means to the line pressure control means to reduce line pressure at a high speed state; and a solenoid valve for controlling the control switch valve in accordance with a control signal of the transmission control unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

Figure 9:
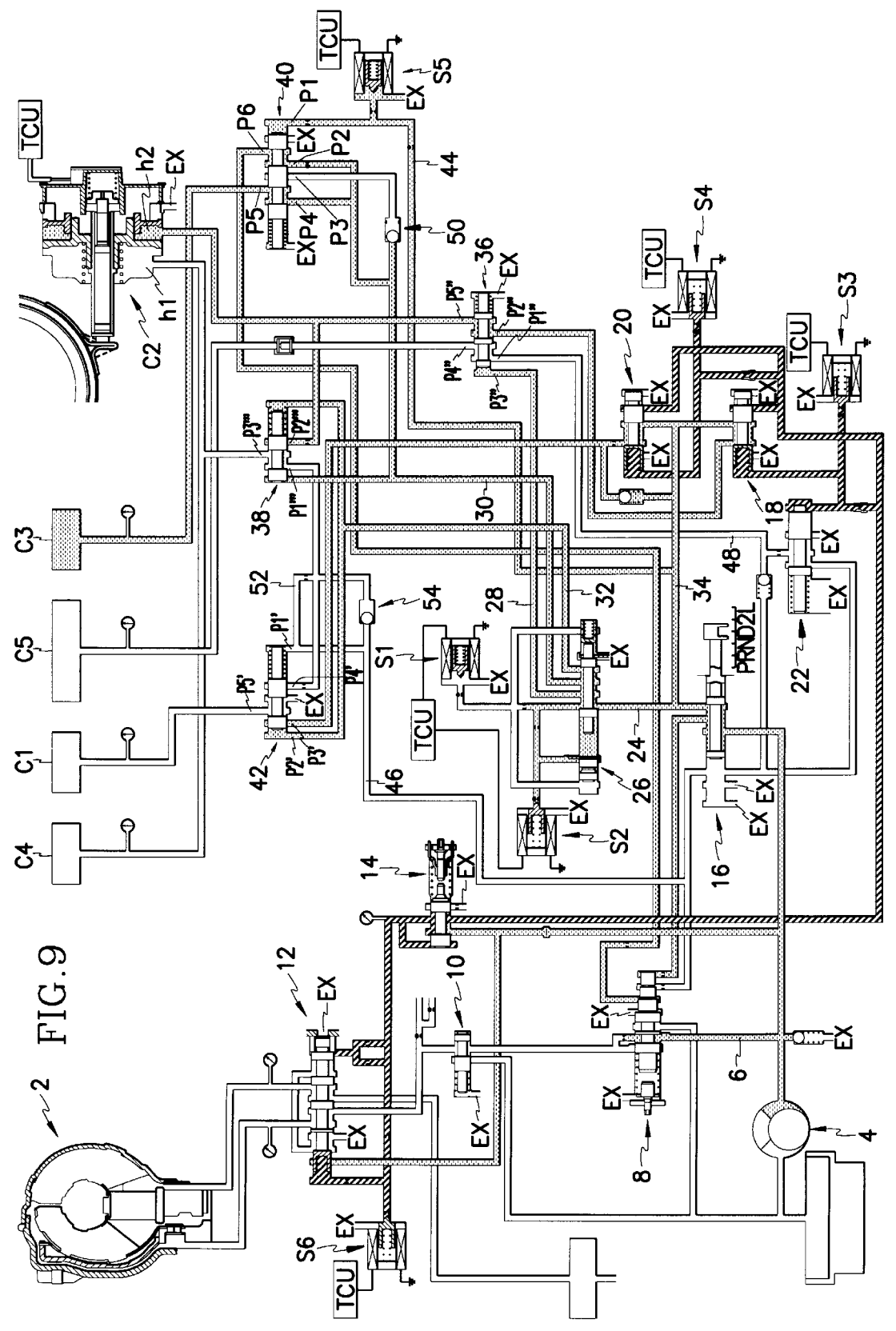

FIG. 9 is a hydraulic circuit diagram showing hydraulic pressure flow in a fourth speed of the drive D range of a hydraulic control system according to a preferred embodiment of the present invention;

DETAILED DESCRIPTION OF PREFERRED EMBODIMENTS

Figure 1:
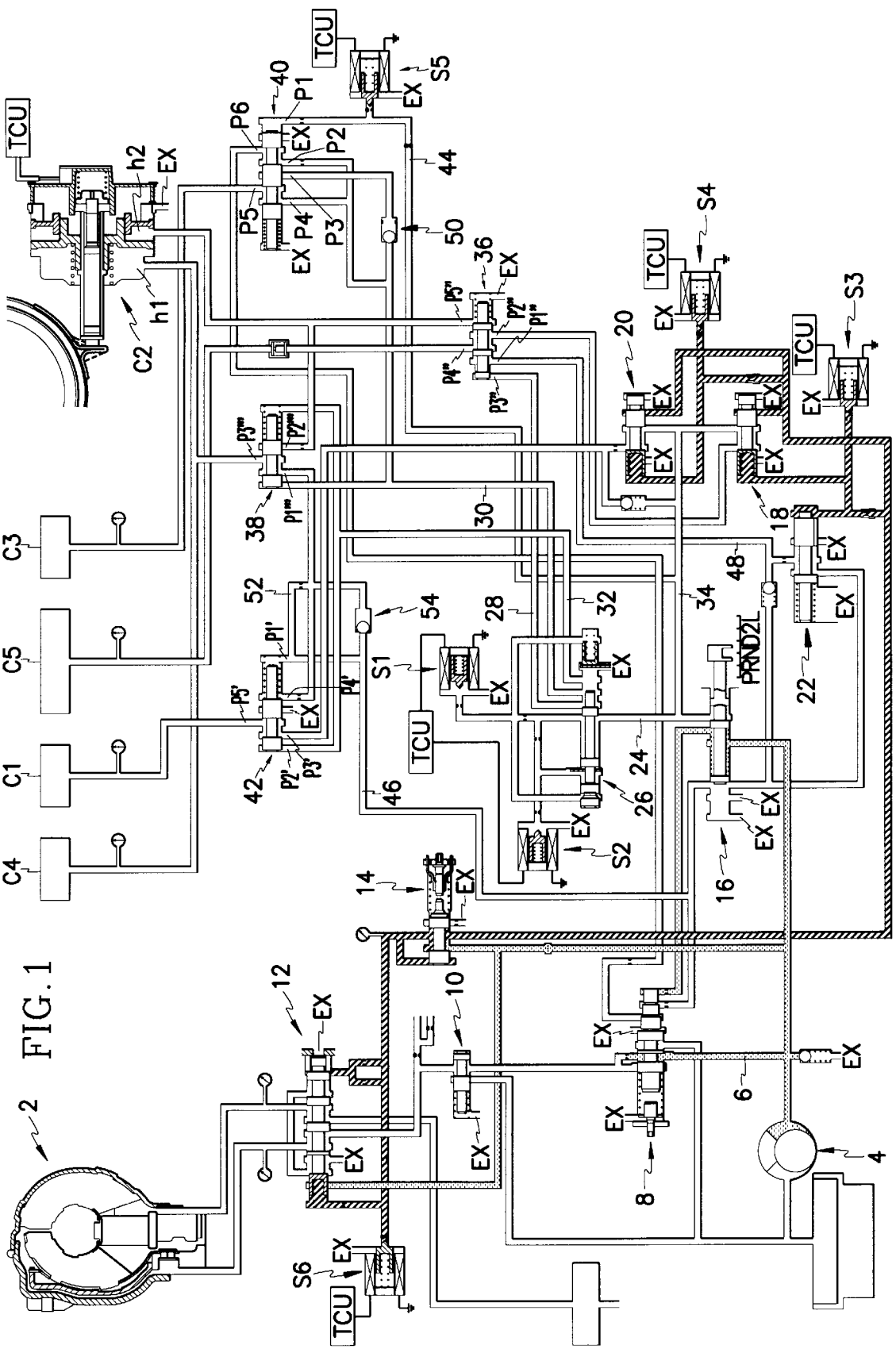
FIG. 1 is a hydraulic circuit diagram showing hydraulic pressure flow in a neutral N range of a hydraulic control system according to a preferred embodiment of the present invention.

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

Referring first to FIG. 1, there is shown a hydraulic circuit diagram showing hydraulic pressure flow in a neutral N range of a hydraulic control system according to the present invention. The hydraulic control system is structured such that hydraulic pressure created by hydraulic pressure generating means is supplied to/released from each friction element to engage/disengage the same, realizing automatic shifting.

In more detail, an hydraulic pump 4, mounted to a pump drive hub of a torque converter 2, is connected to a line pressure passage 6 to enable supply of hydraulic pressure to a pressure regulating valve 8.

The pressure regulating valve 8 supplies hydraulic pressure supplied through the line pressure passage 6 to a torque converter control valve 10, a damper clutch control valve 12, and the torque converter 2 such that lubrication of a transaxle and a damper clutch, mounted in the torque converter 2, are able to be controlled.

Part of the hydraulic pressure supplied from the hydraulic pump 4 is supplied to a reducing valve 14, which reduces line pressure, and to a manual valve 16 indexed by a selector lever (not shown) operated by the driver to determine shift ranges by controlling hydraulic flow.

Part of the hydraulic pressure reduced by the reducing valve 14 is supplied to first and second pressure control valves 18 and 20 to control the same, the first and second pressure control valves 18 and 20 being comprised in a hydraulic pressure controller. Further, another part of the reduced hydraulic pressure is supplied to a N-R control valve 22 which reduces shift shock when changing shift mode from the neutral N range to a reverse R range.

When the manual valve 16, which is comprised in a range controller, is positioned at a drive D range, hydraulic pressure from the manual valve 16 flows into a line 24. The line 24 is connected to a shift control valve 26 which determines the hydraulic flow path by port conversion according to a control of the first and second solenoid valves S1 and S2, ON/OFF controlled by a transmission control unit (TCU), the shift control valve 26 and the solenoid valves S1 and S2 being comprised in a shift controller.

The shift control valve 26 is connected to a second speed line 28, a third speed line 30, and a fourth speed line 32 to control valve spools of spool valves being comprised in a hydraulic pressure distributor.

A first speed line 34 is branched off from the line 24 such that line pressure is supplied to the first and second pressure control valves 18 and 20 which controls the conversion of the hydraulic pressure into control pressure. The first and second pressure control valves 18 and 20 are controlled by third and fourth solenoid valves S3 and S4 to realize port conversion, thereby supplying the control pressure to each friction element.

The shift control valve 26 supplies line pressure to a left side port P3" of a 1-2 shift valve 36 through a second speed line 28 to control a valve spool of the 1-2 shift valve 36. Further, the shift control valve 26 supplies line pressure to a left side port of a 2-3/4-3 shift valve 38 through a third speed line 30 to control a valve spool of the 2-3/4-3 shift valve 38, and, simultaneously, supplies line pressure to a third friction element C3 via a control switch valve 40.

A fourth speed line 32 is connected to a left side port P2' of a 3-4 shift valve 42 and to a right side port of the 2-3/4-3 shift valve 38 to control valve spools of the same valves.

The first speed line 34 is branched off to a line 44 through which line pressure is supplied to a right side port P1 of the control switch valve 40 by control of a fifth solenoid valve S5 on the line 44.

If the manual valve 16 is positioned at a reverse R range, hydraulic pressure flows through a first reverse control line 46 from the manual valve 16 to be supplied to a fourth friction element C4 via the 3-4 shift valve 42 and the 2-3/4-3 shift valve 38. Simultaneously, hydraulic pressure supplied through a second reverse control line 48 from the manual valve 16 is fed to a fifth friction element C5, acting as a reaction element in the reverse R range, via the 1-2 shift valve 36.

Part of the hydraulic pressure supplied to the fourth friction element C4 is supplied to a release chamber h2 of a second friction element C2.

A hydraulic pressure distributor comprises the 1-2 shift valve 36, 3-4 shift valve 42, 2-3/4-3 shift valve 38, and control switch valve 40.

The 1-2 shift valve 36 is controlled by second speed pressure, supplied from the shift control valve 26, such that control pressure controlled by the first pressure control valve 18 is supplied to an operational chamber h2 of the second friction element C2, the second friction element C2 acting as a reaction element in a second speed stage, and the hydraulic pressure in the second reverse control line 48 is supplied to the fifth friction element C5.

For the above operation, the 1-2 shift valve 36 comprises a first port P1" receiving reverse control pressure through the second reverse control line 48 when in the reverse R range, a second port P2" receiving control pressure from the first pressure control valve 18, a third port P3" receiving line pressure from the shift control valve 26 through the second speed line 28 to control a valve spool of the 1-2 shift valve in second, third, and fourth speed states, a fourth port P4" through which the reverse range pressure is supplied to the fifth friction element C5, and a fifth port P5" through which the control pressure supplied from the first pressure control valve 18 is supplied to both the 2-3/4-3 shift valve 38 and the operational chamber h2 of the second friction element C2.

The 2-3/4-3 shift valve 38 is controlled by line pressure supplied through both side ports of the same valve 38 such that either control pressure supplied from the 1-2 shift valve or hydraulic pressure supplied from 3-4 shift valve in the reverse R range is selectively supplied to the release chamber h1 of the second friction element C2 and to the third friction element C4.

For the above operation, the 2-3/4-3 shift valve 38 comprises a left side port connected to the third speed line 30, a first port P1''' connected to the fourth speed line 32, a second port P2''' connected to the 3-4 shift valve 42, a third port P3''' connected to the 1-2 shift valve 36, and a port connected to both the fourth friction element C4 and the release chamber h1 of the second friction element C2.

The control switch valve 40 supplies/exhausts operational pressure to/from the third friction element C3 acting as an input element in the third and fourth speed stages. Further, the control switch valve 40 supplies part of the operational pressure supplied to the third friction element C3 to the pressure regulating valve 8 to more accurately control line pressure.

For the above operation, the control switch valve 40 comprises a first port P1 connected to the manual valve 16 through the line 44 branched off from the first speed line 34; second, third, and fourth ports P2, P3, and P4 connected to the shift control valve 26 through the third speed line 30; a fifth port P5 connected to the third friction element C3; and a sixth port P6 connected to the pressure regulating valve 8.

The second and fourth ports P2 and P4 are selectively communicated with the sixth and fifth ports, P6 and P5, respectively, according to a location of the valve spool of the control switch valve 40. On a line connected to the third port P3 is disposed a check valve 50 for delaying the exhaust of hydraulic pressure from the third friction element C3.

The 3-4 shift valve 42 is controlled by line pressure through the fourth speed line 32 from the shift control valve 26 such that the 3-4 shift valve 42 supplies control pressure from the second pressure control valve 20 to the first friction element C1 in the first, second, and third speeds and exhausts the control pressure supplied to the first friction element C1 during 3-4 upshifting. Further, the 3-4 shift valve 42 exhausts the hydraulic pressure, supplied to the fourth friction element C4 and the release chamber h1 of the second friction element C2, through the manual valve 16 via the 2-3/4-3 shift valve 38 and the first reverse control line 46.

For the above operation, the 3-4 shift valve 42 comprises a first port P1' connected to the manual valve 16 through the first reverse control line 46, a second port P2' connected to the shift control valve 26 through the fourth speed line 32, a third port P3 connected to the second pressure control valve 20, a fourth port P4' connected to the 2-3/4-3 shift valve 38, and a fifth port P5' connected to the first friction element C1 and selectively communicated with the port connected to the second pressure control valve 20.

The first reverse control line 46 is connected to a circulation line 52. Namely, the first port P1' is directly connected to the first reverse control line 46 and the fourth port P4' is connected to both the circulation line 52 and the 2-3/4-3 shift valve 38. On the circulation line 52 is disposed a check valve 54 for delaying the exhaust of hydraulic pressure from the 3-4 shift valve 42 and the 2-3/4-3 shift valve 38 through the first reverse control line 46.

Reference numeral S6, which has not yet been described, is a sixth solenoid valve. The sixth solenoid valve S6 controls the damper clutch control valve 12 according to a control signal of the TCU.

The flow of hydraulic pressure and shift processes for each shift stage in the hydraulic control system structured as in the above will now be described with reference to the accompanying drawings.

When in the neutral N range as shown in FIG. 1, hydraulic pressure from the hydraulic pump 4 is regulated to a predetermined level by the pressure regulating valve 8 and reduced by the reducing valve 14 to be supplied to the first and second pressure control valve 18 and 20, and to the damper clutch control valve 12.

Here, the third and fourth solenoid valve S3 and S4 are duty-controlled to OFF by the TCU such that the valve spools of the pressure control valves 18 and 20 move to the right.

Figure 2:
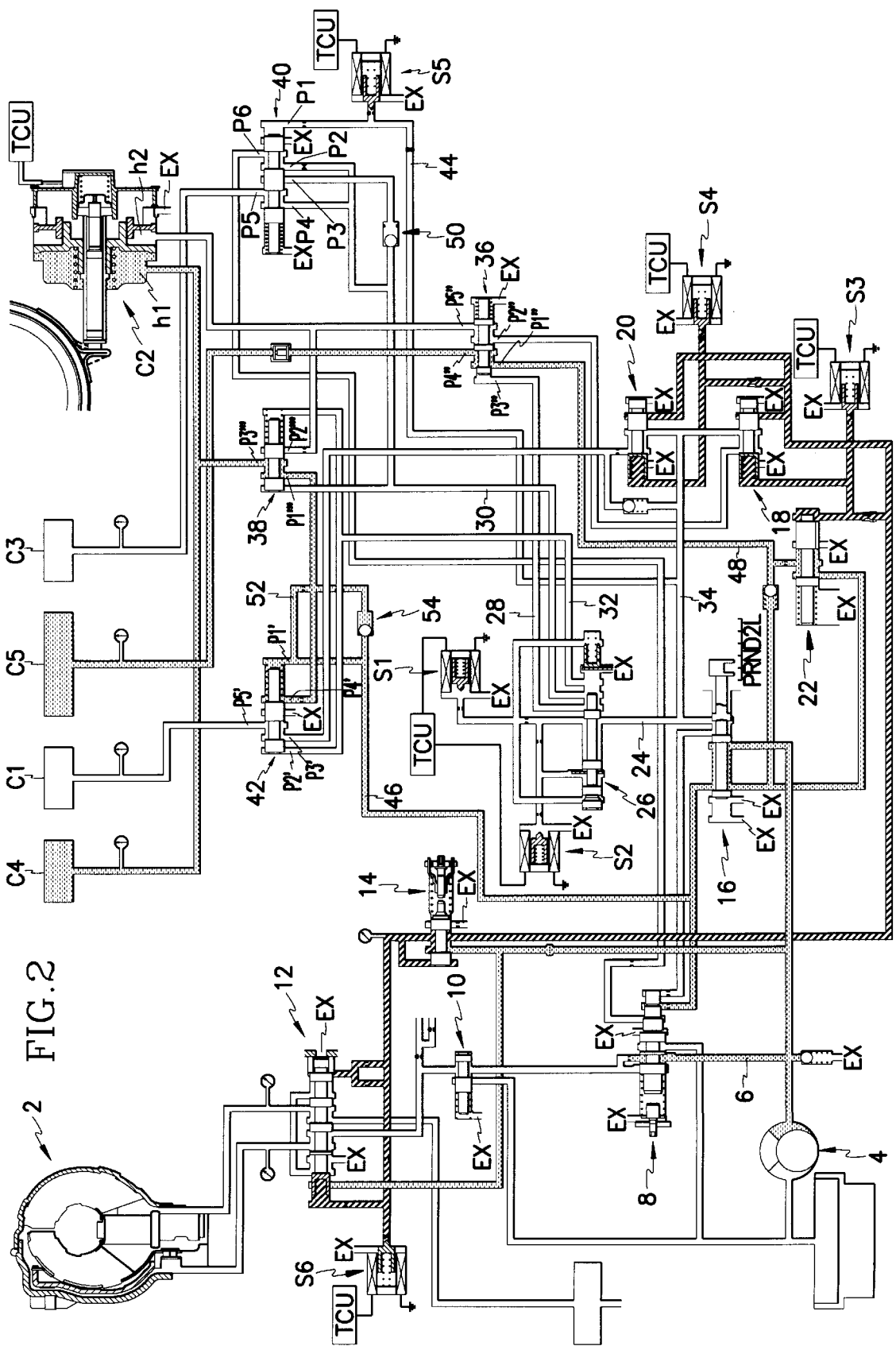
FIG. 2 is a hydraulic circuit diagram showing hydraulic pressure flow in a reverse R range of a hydraulic control system according to a preferred embodiment of the present invention.

For the above state, when the manual valve 16 is positioned in the reverse R range, as shown in FIG. 2, part of the hydraulic pressure from the manual valve 16 is supplied to the fourth friction element C4 and the release chamber hi of the second friction element C2 through the first reverse control line 46 via the 2-3/4-3 shift valve 38. Also, part of the hydraulic pressure is supplied to the 1-2 shift valve 36 through the second reverse control pressure line 48 via the N-R control valve 22 duty-controlled by the third solenoid valve S3. Accordingly, the valve spool of the 1-2 shift valve 36 moves to the right such that the hydraulic pressure is supplied to the fifth friction element C5 acting as a reaction element in the reverse R range.

Figure 3:
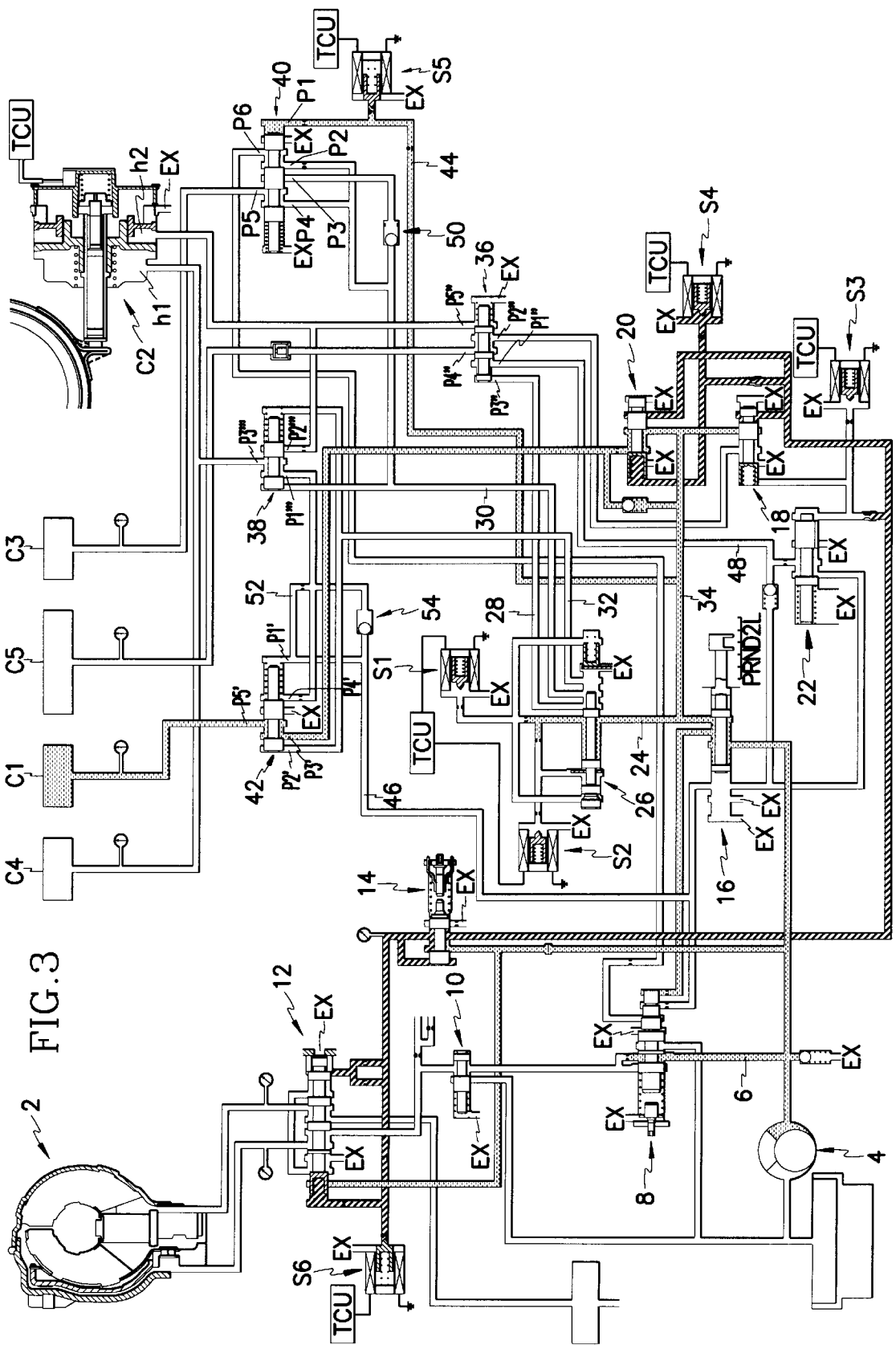
FIG. 3 is a hydraulic circuit diagram showing hydraulic pressure flow in a first speed of a drive D range of a hydraulic control system according to a preferred embodiment of the present invention.

If the manual valve 16 is positioned in the drive D range from the neutral N range, as shown in FIG. 3, part of hydraulic pressure being supplied from the manual valve 16 is supplied to the first and second pressure control valves 18 and 20, and to the shift control valve 26.

Here, the first and second solenoid valve S1 and S2 are controlled to ON such that the valve spool of the shift control valve 26 is positioned identically as that in the neutral N range.

Further, in this state, the third solenoid valve S3 is controlled to ON such that the hydraulic pressure is not able to be supplied to the first pressure control valve 18. Thus, the hydraulic pressure passes through the second pressure control valve 20 to be supplied to the first friction element C1, acting as an input element in the first speed stage of the drive D range, through the 3-4 shift valve 42 such that shifting into the first speed of the drive D range is realized.

Figure 4:
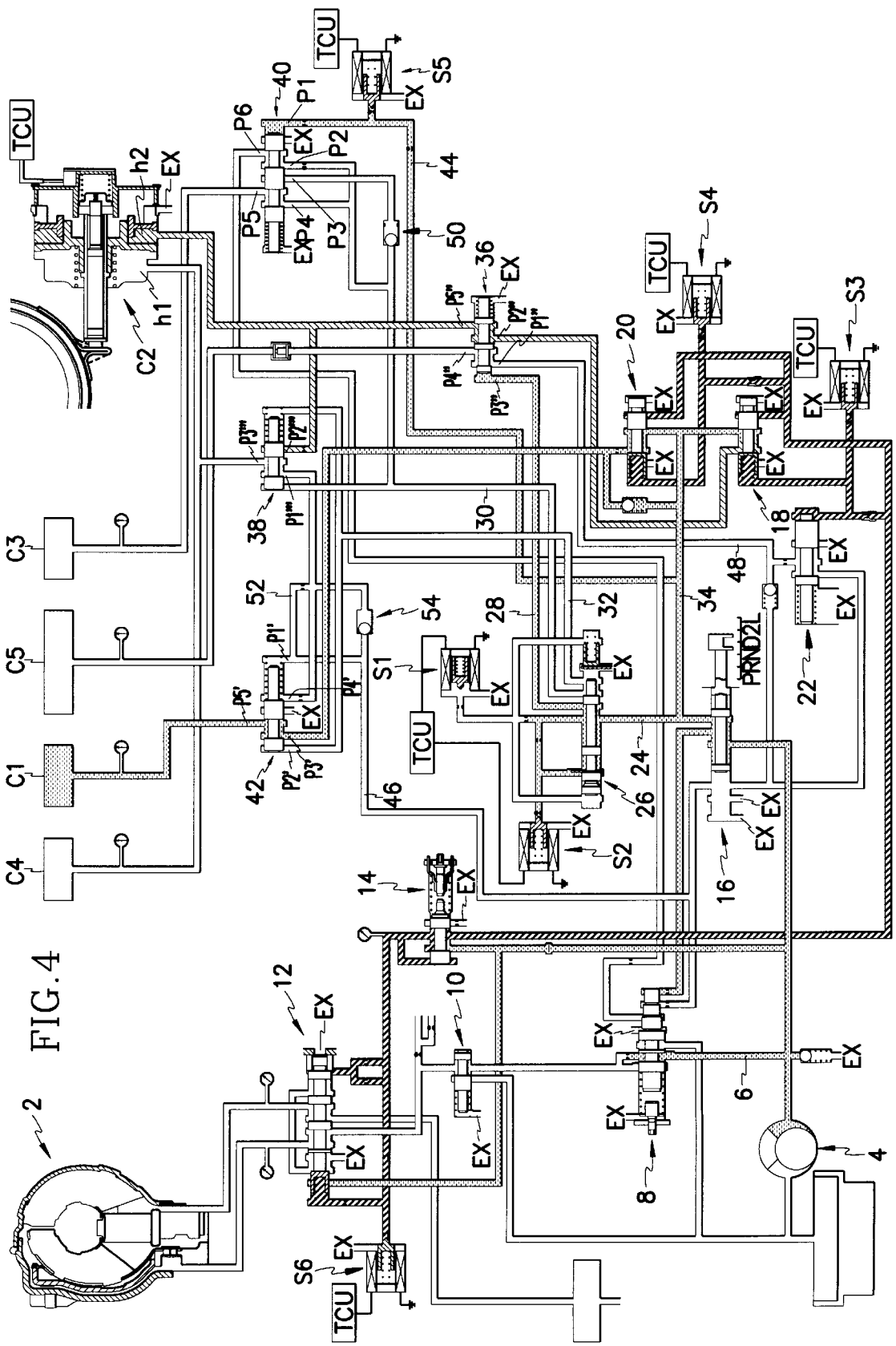
FIG. 4 is a hydraulic circuit diagram showing hydraulic pressure flow during 1-2 upshifting in the drive D range of a hydraulic control system according to a preferred embodiment of the present invention.

If throttle opening and vehicle speed are increased in the first speed state, the TCU controls the second solenoid valve S2 to ON from OFF such that the shift control valve 26 supplies the hydraulic pressure supplied from the manual valve 16 to the second speed line 28, as shown in FIG. 4. Accordingly, the hydraulic pressure is supplied to the third port P3' of the 1-2 shift valve 36 to move the valve spool of the same to the right.

The third solenoid valve S3 is duty-controlled such that the first pressure control valve 18 duty-controls the hydraulic pressure in the first speed line 34 to convert the same into control pressure. The control pressure is supplied to the operational chamber h2 of the second friction element C2 via the 1-2 shift valve 36.

Here, part of the control pressure from the 1-2 shift valve 36 is supplied to the 2-3/4-3 shift valve 38 and stands by at this valve 38.

Figure 5:
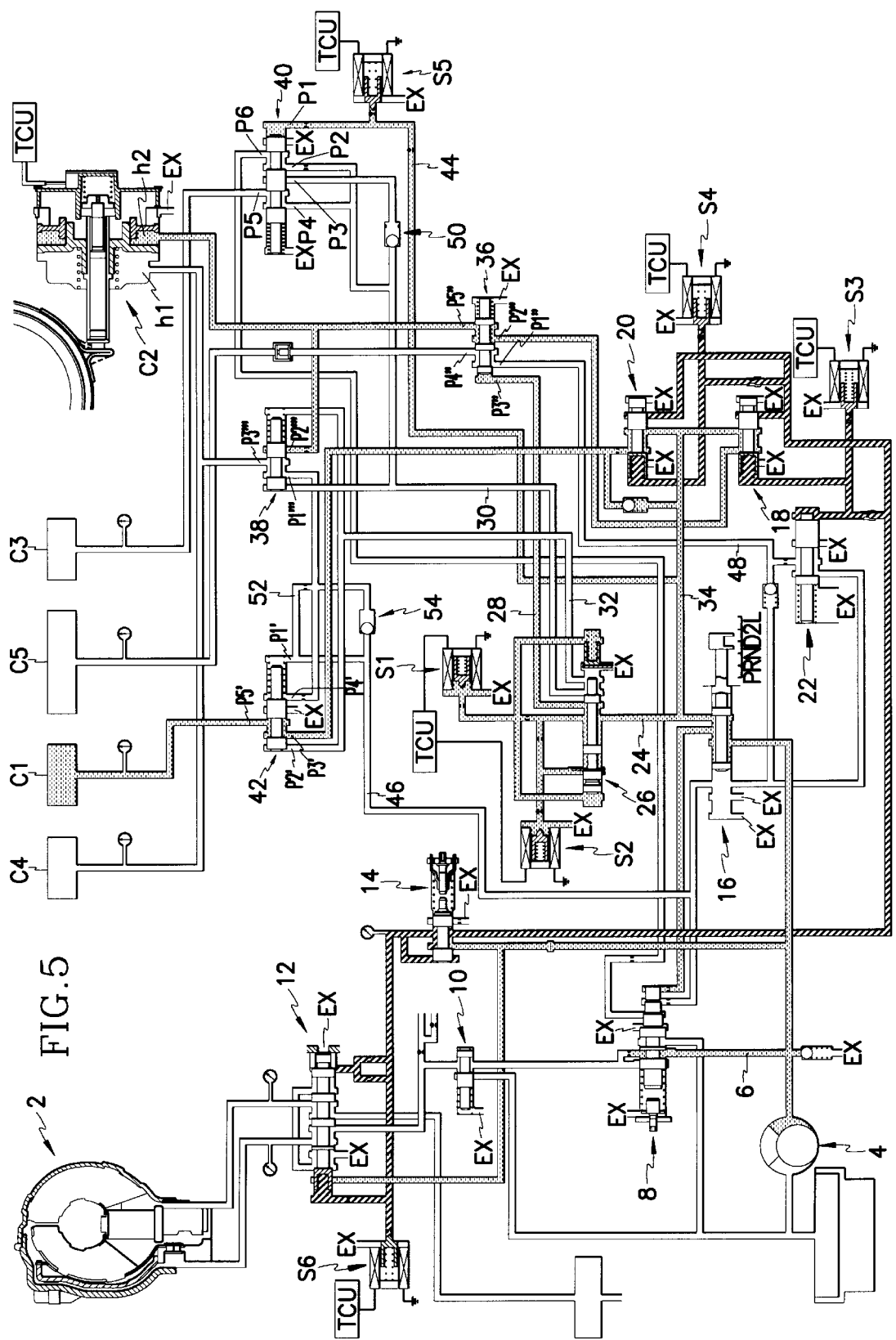
FIG. 5 is a hydraulic circuit diagram showing hydraulic pressure flow in a second speed of the drive D range of a hydraulic control system according to a preferred embodiment of the present invention.

In this state, if the third solenoid valve S3 is controlled to OFF, as shown in FIG. 5, hydraulic pressure is supplied to the operational chamber h2 of the second friction element C2 from the first pressure control valve 18 such that shifting into the second speed of the drive D range is realized.

Figure 6:
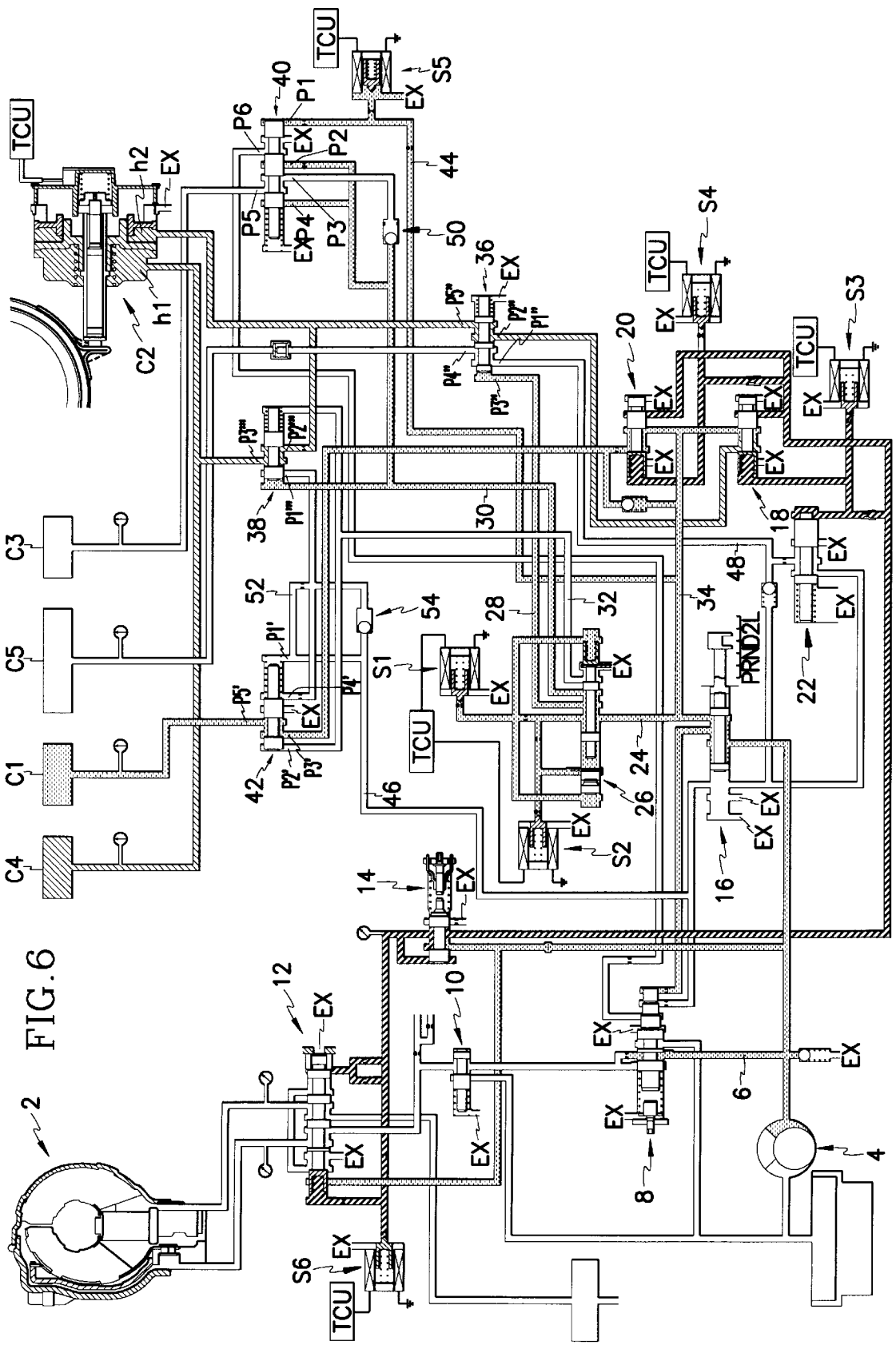
FIG. 6. is a hydraulic circuit diagram showing hydraulic pressure flow during 2-3 upshifting in the drive D range of a hydraulic control system according to a preferred embodiment of the present invention.

If vehicle speed and throttle opening are increased in the above state, the first and second solenoid valves S1 and S2 are controlled to OFF as shown in FIG. 6. By this control, hydraulic fluid flows into the second speed line 28 and the third speed line 30. Thus, line pressure in the third speed line 30 is supplied to the left side port of the 2-3/4-3 shift valve 38 such that the valve spool of the same moves to the right.

Accordingly, the hydraulic pressure standing by at the 2-3/4-3 shift valve 38 in the second speed is supplied to the release chamber h1 of the second friction element C2 to stop the operation of the same and, simultaneously, to the fourth friction element C4.

Figure 7:
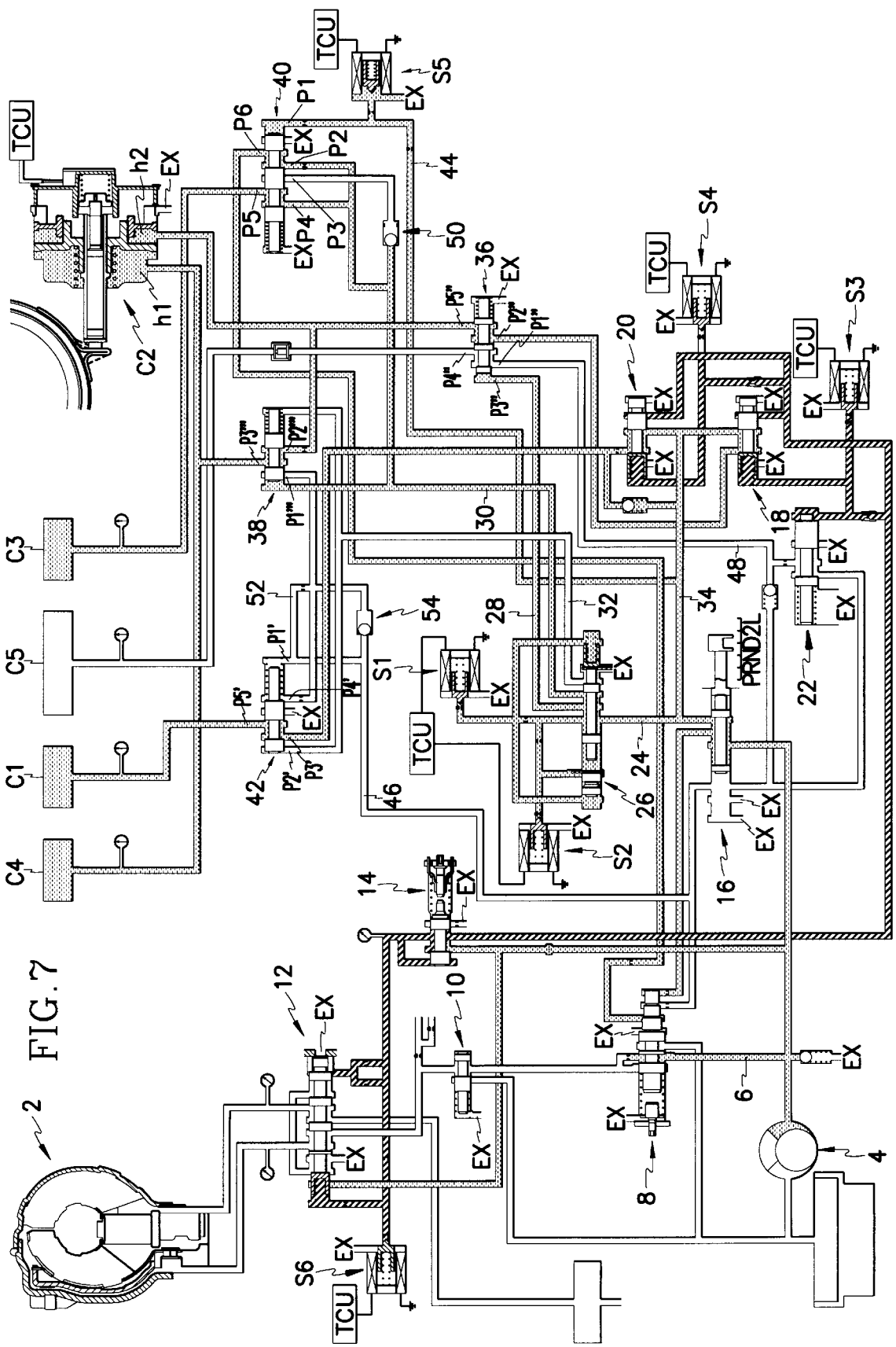
FIG. 7 is a hydraulic circuit diagram showing hydraulic pressure flow in a third speed of the drive D range of a hydraulic control system according to a preferred embodiment of the present invention.

In this state, if the fifth solenoid valve S5 is controlled to OFF from ON as shown in FIG. 7, the valve spool of the control switch valve 40 moves to the left such that line pressure in the third speed line 30 is supplied to the third friction element C3 to realize shifting into the third speed of the drive D range. Part of the line pressure in the third speed line 30 is supplied to the pressure regulating valve 8 via the control switch valve 40 to accurately control line pressure.

Namely, line pressure is reduced by the above control. The reduction of line pressure substantially minimizes power loss of the hydraulic pump 4. Further, when 2-3 shifting, operating timing of the third friction element C3 is accurately controlled by not hydraulic pressure from the shift control valve 26 but the fifth solenoid valve S5. Accordingly, the problem of shifting temporarily into the neutral N range during shifting between shift stages in the drive D range is prevented.

Figure 8:
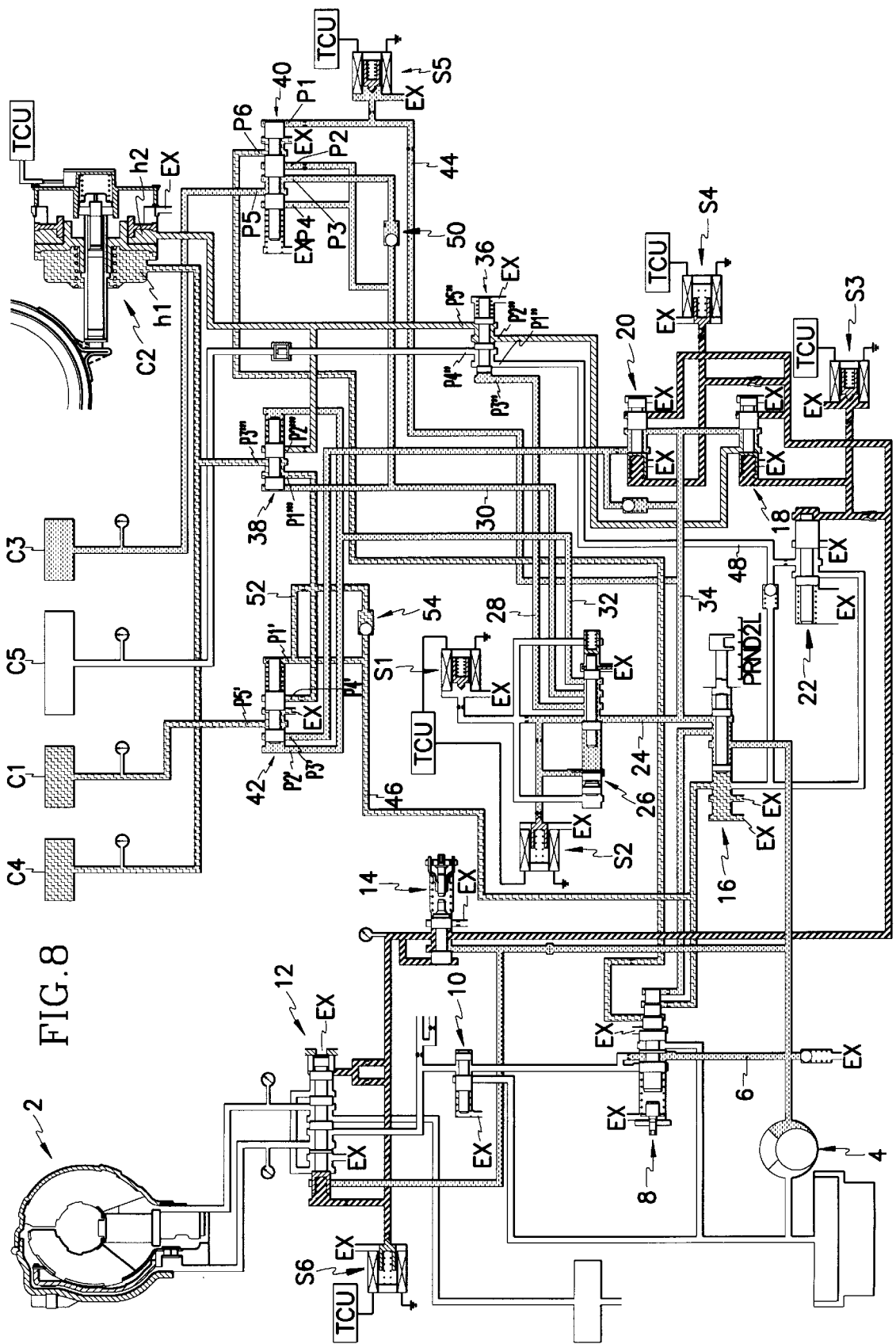
FIG. 8 is a hydraulic circuit diagram showing hydraulic pressure flow during 3-4 upshifting in the drive D range of a hydraulic control system according to a preferred embodiment of the present invention.

If vehicle speed and throttle opening are increased in the third speed state, as shown in FIG. 8, the TCU controls the first and fifth solenoid valves S1 and S5 to ON such that hydraulic fluid flows into the second, third, and fourth speed lines 28, 30, and 32. Further, the third solenoid valve S3 is duty-controlled.

Accordingly, line pressure in the fourth speed line 32 is supplied to the second port P2' of the 3-4 shift valve 42 and the right side port of the 2-3/4-3 shift valve 38 such that the valve spool of the 3-4 shift valve 42 moves to the right and the valve spool of the 2-3/4-3 shift valve 38 moves to the left. Although line pressure is simultaneously supplied to the left side port of the 2-3/4-3 shift valve 38, because the valve spool is biased to the left by an elastic member, the valve spool moves to the left.

Consequently, the hydraulic pressure in the first friction element C1 is exhausted through an exit port Ex of the 3-4 shift valve 42. Further, the hydraulic pressure supplied to the release chamber h1 of the second friction element C2 is exhausted through an exit port Ex of the manual valve 16 via the 2-3/4-3 shift valve 38, 3-4 shift valve 42, and the first reverse control line 46. Here, the hydraulic pressure is slowly exhausted by the check valve 54 disposed in the circulation line 52 connected to the first reverse control line 46.

After completing the above control process, the valve spool of the control switch valve 40 moves to the left by OFF-control of the fifth solenoid valve S5 such that line pressure which is not controlled by the first pressure control valve 18 is supplied to the operational chamber h2 of the second friction element C2 to realize shifting into the fourth speed of the drive D range.

Figure 10:
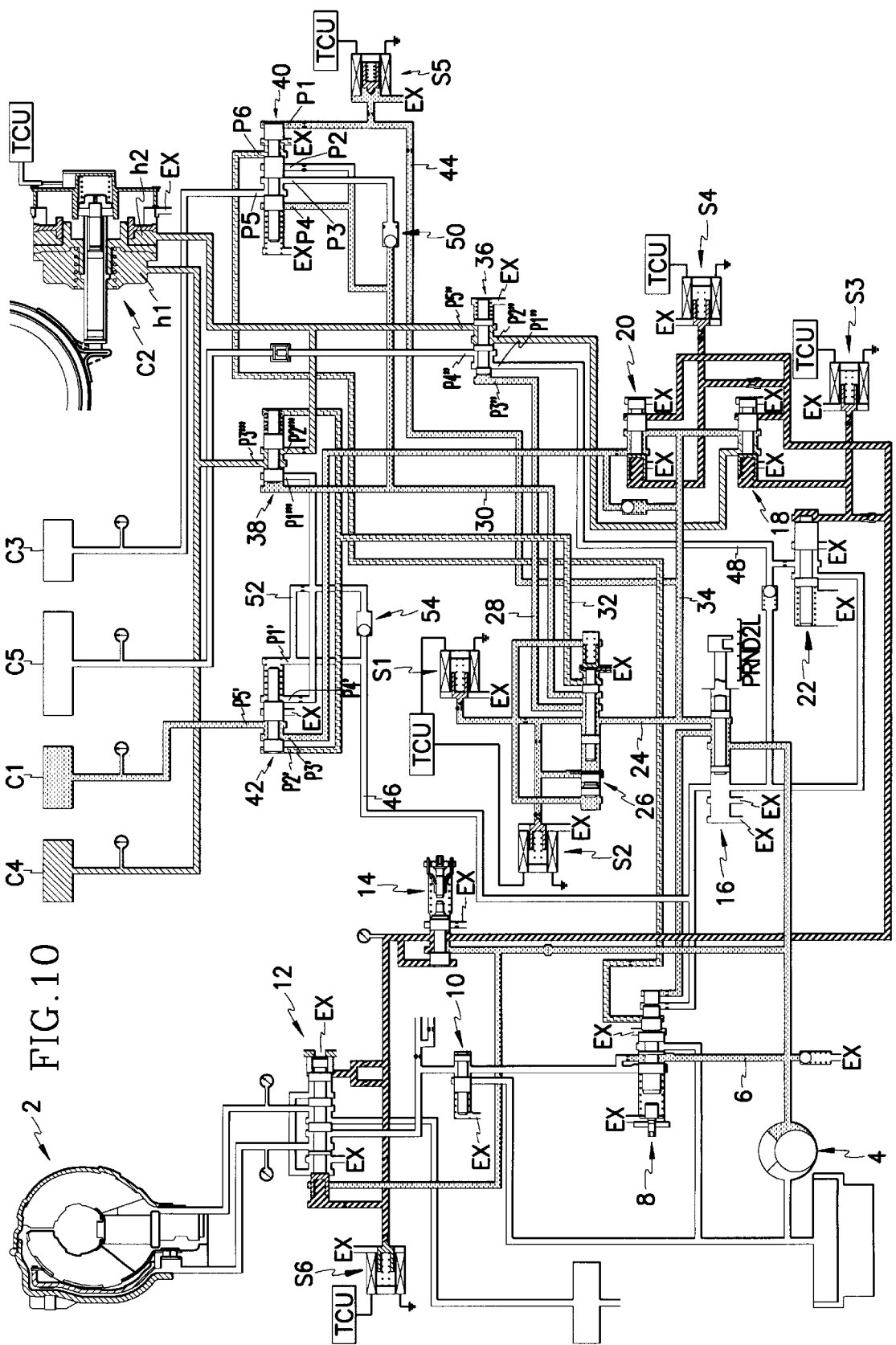
FIG. 10 is a hydraulic circuit diagram showing hydraulic pressure flow during 4-3 downshifting in the drive D range of a hydraulic control system according to a preferred embodiment of the present invention.

When downshifting into the third speed state from the fourth speed state, the first solenoid valve S1 is controlled to OFF as shown in FIG. 10 such that line pressure in the fourth speed line 32 is exhausted through the shift control valve 26. Accordingly, the valve spool of the 3-4 shift valve 42 moves to the left.

Further, by duty-control of the third and fourth solenoid valves S3 and S4, part of the control pressure regulated by the first pressure control valve 18 is supplied to the operational h2 of the second friction element C2 via the 1-2 shift valve 36, and another part of control pressure is supplied to the fourth friction element C4 and the release chamber h1 of the second friction element C2 via the 2-3/4-3 shift valve 38.

The second pressure control valve 20 duty-controls and supplies hydraulic pressure to the first friction element C1 via the 3-4 shift valve 42 to realize shifting into the third speed state from the fourth speed state.

Namely, when 4-3 shifting, the first friction element C1 receives control pressure duty-controlled by the third solenoid valve S3. Consequently, shift shock is reduced and temporary shifting into the neutral N state is prevented.

Figure 11:
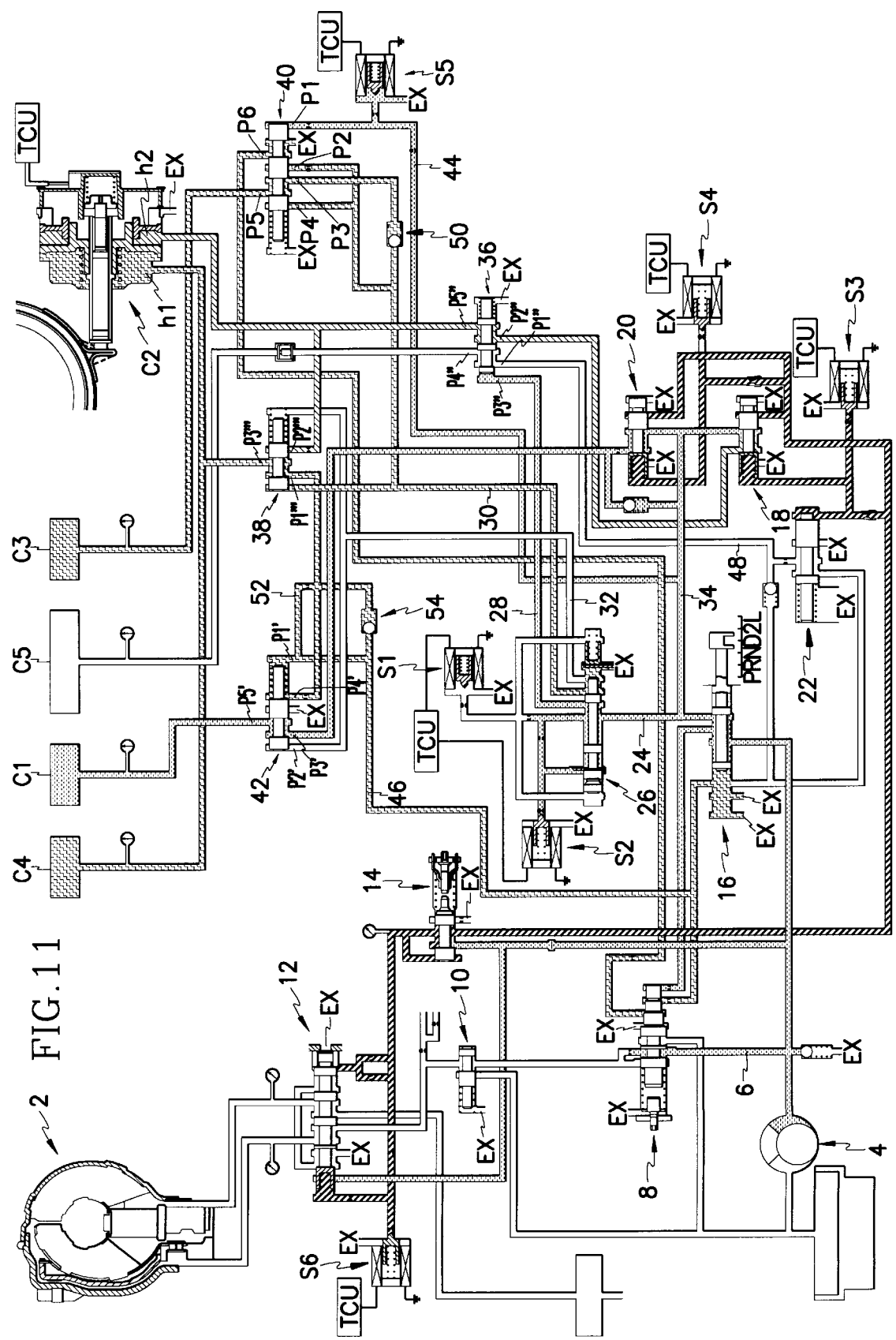
FIG. 11 is a hydraulic circuit diagram showing hydraulic pressure flow during 3-2 downshifting in the drive D range of a hydraulic control system according to a preferred embodiment of the present invention.

When downshifting into the second speed state from the third speed state as shown in FIG. 11, the first solenoid valve S1 is controlled to ON such that the hydraulic pressure in the third friction element C3 is quickly exhausted through the shift control valve 26 via the third speed line 30.

Accordingly, the hydraulic pressure in the fourth friction element C4 and the release chamber h1 of the second friction element C2 is exhausted through the manual valve 16 via the 2-3/4-3 shift valve 38, the 3-4 shift valve 42, and the first reverse control line 46. Further, the hydraulic pressure supplied to the pressure regulating valve 8 to the control switch valve 40 is exhausted through an exit port EX of the control switch valve 40.

Figure 12:
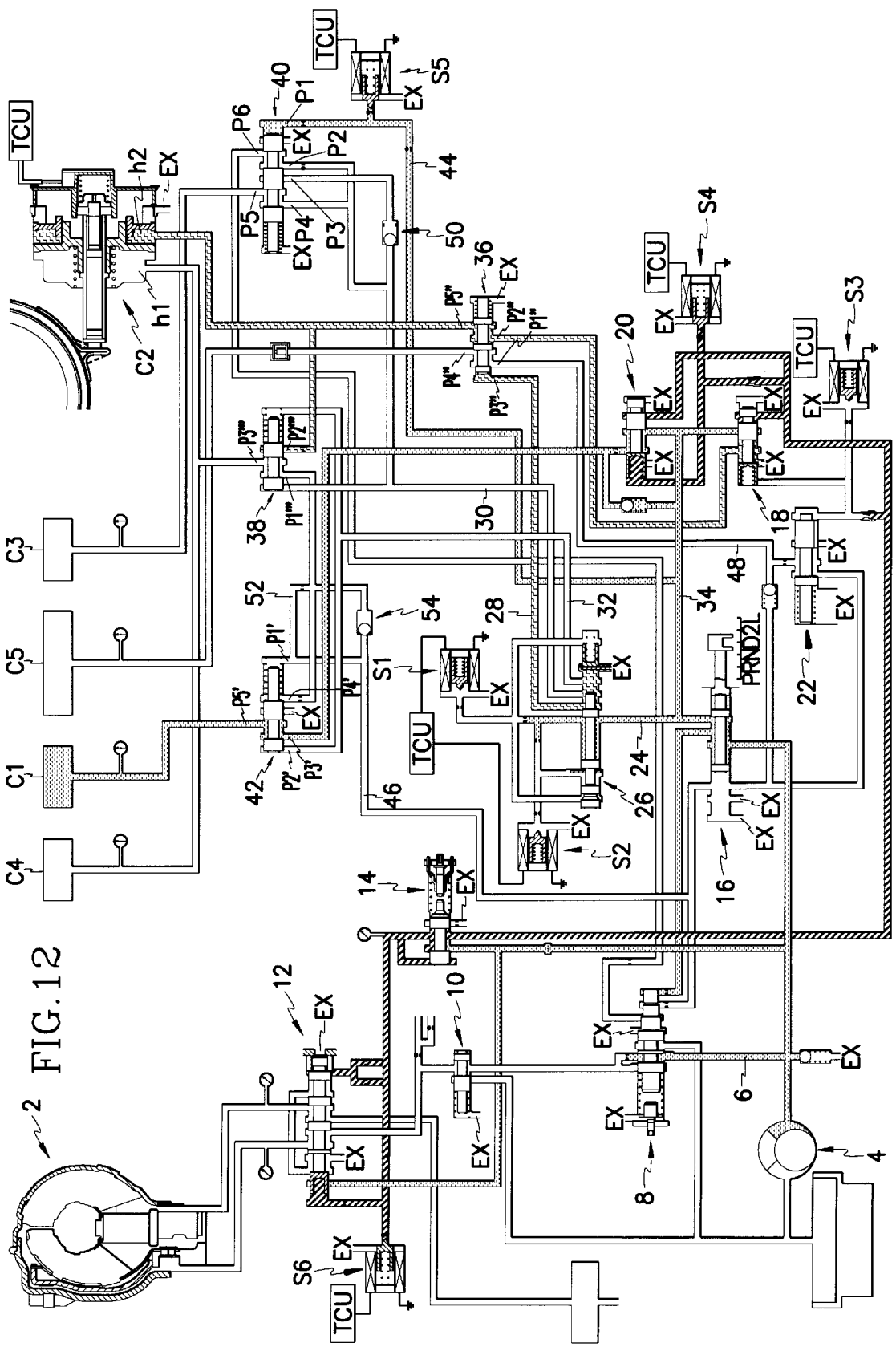
FIG. 12 is a hydraulic circuit diagram showing hydraulic pressure flow during 2-1 downshifting in the drive D range of a hydraulic control system according to a preferred embodiment of the present invention.

When downshifting into the first speed state from the second speed state as shown in FIG. 12, the first solenoid valve S1 is maintained in an ON state and the second solenoid valve S2 is controlled to OFF. Further, the fifth solenoid valve S5 is maintained in an OFF state.

Accordingly, line pressure in the second speed line 28 is quickly exhausted through the exit port Ex of the shift control valve 26 and the hydraulic pressure in the operational chamber h2 of the second friction element C2 is exhausted through the first pressure control valve 18 by port conversion of the 1-2 shift valve 36 such that 2-1 shifting is realized.

As described above, in the hydraulic control system according to the present invention, when 2-3 or 4-3 shifting, the fifth solenoid valve S5, controlled by the TCU, is additionally used such that the switch control valve 40 precisely and quickly controls the operating timing of the third friction element C3. Accordingly, the phenomenon in which shifting into the neutral N range during shifting between different shift stages in the drive D range is prevented. In particular, the control switch valve 40 controls the pressure regulating valve 8 to reduce line pressure at high speed stages (i. e., the third and fourth speeds) such that power loss of the hydraulic pump 4 is reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission including a plurality of friction elements associated with respective transmission speeds, the hydraulic control system comprising:

a hydraulic fluid source;

line pressure control means for regulating hydraulic pressure from the fluid source to line pressure;

reducing pressure control means for reducing hydraulic pressure from the line pressure control means;

range control means for selectively supplying hydraulic pressure from the line pressure control means;

shift control means for supplying hydraulic pressure from the range control means to lines corresponding to respective shift ranges by control of a transmission control unit;

hydraulic pressure control means for duty-controlling hydraulic pressure, supplied from the range control means, to convert the duty-controlled hydraulic pressure into control pressure for operating the friction elements; and hydraulic pressure distributing means for determining a hydraulic flow path corresponding to each shift range by operating valves according to the hydraulic pressure from the shift control means or the control pressure to each of the friction elements;

wherein the hydraulic pressure distributing means comprises:

a 3-4 shift valve for realizing port conversion during 3-4 shifting to selectively supply/exhaust the control pressure to/from at least one of the friction elements corresponding to the respective transmission speeds;

a 2-3/4-3 shift valve for realizing port conversion during 2-3 or 4-3 shifting to selectively supply/exhaust the control pressure to/from at least one of the friction elements corresponding to the respective transmission speeds;

a 1-2 shift valve for realizing port conversion during 1-2 shifting to selectively supply/exhaust the control pressure and hydraulic pressure from the range control means to/from the 2-3/4-3 shift valve and at least one of the friction elements corresponding to the respective transmission speeds;

a control switch valve for selectively supplying/exhausting hydraulic pressure from the shift control means to at least one of the friction elements corresponding to the respective transmission speeds to control operating timing of each corresponding friction element and supplying the hydraulic pressure from the shift control means to the line pressure control means to reduce line pressure at a high speed stage, wherein the control switch valve comprises a first port connected directly to the range control means; second, third, and fourth ports connected to the shift control means through a line along which line pressure flows in third and fourth speeds; a fifth port connected to the third friction element acting as an input element in the third and fourth speeds of the drive D range and selectively communicating with the third and fourth ports, said third port being communicated with the fifth port during 3-2 and 3-4 shifting; and a sixth port connected to the line pressure control means and selectively communicating with the second port; and a solenoid valve for controlling the control switch valve in accordance with a control signal of the transmission control unit.

2. The hydraulic control system of claim 1, wherein said 3-4 shift valve comprises:

a first port connected to the range control means;

a second port connected to the shift control means;

a third port connected to the hydraulic pressure control means;

a fourth port connected to the 2-3/4-3 shift valve; and a fifth port connected to a first one of the friction elements acting as an input element in first, second, and third speeds of the drive D.

3. The hydraulic control system of claim 1, wherein the 2-3/4-3 shift valve comprises:

two side ports for receiving hydraulic pressure from the shift control means for controlling a valve spool of the 2-3/3-4 shift valve;

a first port connected to the 3-4 shift valve;

a second port connected to the hydraulic pressure control means via the 1-2 shift valve; and a third port connected to a forth one of the friction elements acting as an input element in a reverse R range and the third speed of the drive D range and, simultaneously, connected to a chamber for disengaging a second one the friction elements acting as a reaction element in second and fourth speeds of the drive D range.

4. The hydraulic control system of claim 1, wherein the 1-2 shift valve comprises:

a first port connected to the range control means;

a second port connected to the hydraulic pressure control means;

a third port connected to the shift control means;

a fourth port connected to a fifth one of the friction elements acting as a reaction element in the reverse R range; and a fifth port simultaneously connected to the 2-3/4-3 shift valve and a chamber for engaging the second friction element acting as a reaction element in second and fourth speeds of the drive D range.

5. The hydraulic control system of claim 2, wherein the first port of the 3-4 shift valve is connected to a circulation line on which a check valve for delaying an exhaust of hydraulic pressure is displaced, said circulation line being connected to the 2-3/4-3 shift valve.

6. The hydraulic control system of claim 1, wherein a check valve for delaying an exhaust of hydraulic pressure is disposed on a line connected to the third port of the control switch valve.

* * * * *